Patented Sept. 12, 1944

2,358,048

UNITED STATES PATENT OFFICE 2,358,048

PREPARATION OF ESTERS OF POLYBASIC CYCLIC UNSATURATED ACIDS

William P. Bitler, Haverstraw, and Leonard Nicholl, Nyack, N. Y., assignors to Kay-Fries Chemicals, Inc., West Haverstraw, N. Y., a corporation of New York No Drawing. Application September 19, 1941, Serial No. 411,516

3 Claims. (Cl. 260—468)

This invention relates to the preparation of esters of polybasic cyclic unsaturated acids, and more particularly to the preparation of 1.2.3.4 tetra hydro 1.2.3.4 tetra carbmethoxyl benzene.

Hitherto, in the preparation of 1.2.3.4 tetra hydro 1.2.3.4 tetra carbmethoxyl benzene the following reaction has been used:

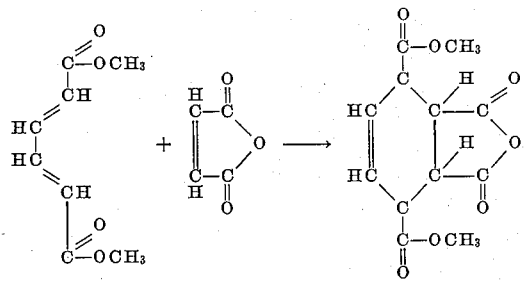

the resulting compound may then be esterified to form the desired ester, which may be used as a plasticizer for cellulose acetate. However, this reaction does not go very rapidly and the yield is distinctly poor due to the formation of a considerable amount of resinous by-products. These undesirable side reactions contaminate the ester and render its purification very difficult.

It has now been found that these disadvantages may be avoided by the direct esterification of a compound containing a double bond with at least one carbonyl group adjacent to it, and adding another compound containing a conjugated double bond system.

A specific example of the present invention comprises the direct formation, without by-products, of 1.2.3.4 tetra hydro 1.2.3.4 tetra carbmethoxyl benzene by the condensation of dimethyl muconate and dimethyl maleate, according to the following equation:

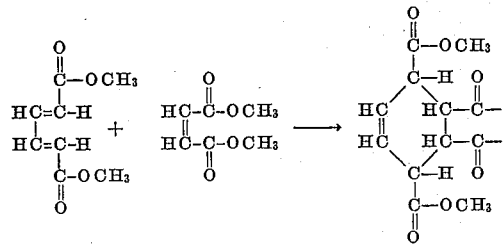

The desired compound is thus obtained in a single step reaction and higher yield.

This modification of the Diels-Alder reaction is novel, and has not been previously described in the literature. The marked simplicity of the reaction together with an improved yield of a purer product makes for commercial exploitation of these highly desirous materials which find preferred use in the plastics industry, and specifically as a plasticizer for cellulose acetate.

While the description above covers the condensation of dimethyl muconate and dimethyl maleate directly, without the use of any diluting medium, the novel process also comprehends the effecting of the condensation reaction in solution in an inert organic solvent, such, for example, as monochlor benzene. As illustrating such a reaction the following procedure is given:

20 g. dimethyl muconate and 17 g. dimethyl maleate are dissolved in 200 c.c. monochlorbenzene. The reaction mixture is heated for 2½–3 hrs. at 97°–100°. The reaction mixture is then allowed to cool, when the product 1.2.3.4 tetra hydro.1.2.3.4.tetra carbmethoxy benzene crystallizes out. Some of the solvent may be evaporated from the mother liquor, preferably at temperatures not exceeding 100°, when on cooling a second crop of crystals of the product will be recovered. A yield of approximately 60% of theory based on dimethyl muconate is obtained. This compares with a yield of approximately 19% of theory, based on dimethyl muconate, when the preparation is carried out by condensing maleic anhydride with dimethyl muconate and then esterifying the product.

Other inert organic solvents, with a boiling point over 100° may be used. Also higher or lower concentrations of reagents and lower or higher temperatures may be used. The preferable conditions are as given above.

What is claimed is:

1. The improved process for the preparation of 1.2.3.4 tetra hydro 1.2.3.4 tetra carbmethoxyl benzene, comprising directly condensing dimethyl muconate with dimethyl maleate according to the equation:

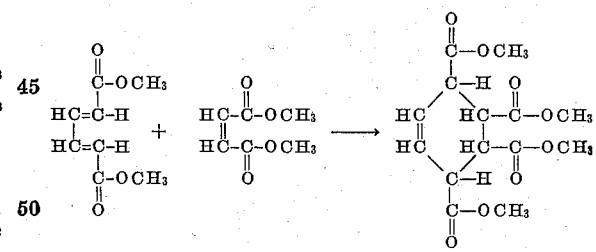

2. The method of preparing esters of polybasic cyclic unsaturated acids, comprising condensing the di-ester of a polybasic acid having a double bond with at least one carbonyl group adjacent to it directly with an ester of a polybasic acid containing a conjugated double bond system.

3. The method of preparing 1.2.3.4 tetra hydro 1.2.3.4 tetra carbmethoxy benzene, comprising dissolving substantially 20 grams dimethyl muconate and 17 grams dimethyl maleate in 200 c. c. monochlorbenzene, heating the solution at temperatures of 97 to 100° C. for a time period of 2½–3 hours, cooling the reaction mixture and separating out 1.2.3.4 tetra hydro 1.2.3.4 tetra carbmethoxy benzene; filtering off the separated crystalline products, evaporating a portion of the separated mother liquor to remove some solvent and at temperatures not exceeding 100°, cooling the partially evaporated mother liquor and recovering a second crop of crystals of 1.2.3.4 tetra hydro 1.2.3.4 tetra carbmethoxy benzene.

WILLIAM P. BITLER.
LEONARD NICHOLL.